United States Patent [19]  [11] Patent Number: 4,897,228
Miwa et al.  [45] Date of Patent: Jan. 30, 1990

[54] METHOD FOR PRODUCING OPTICAL DISK BASE

[75] Inventors: Hiroaki Miwa; Tetsuo Tajima, both of Fujisawa; Ryoichi Sudo, Yokosuka, all of Japan

[73] Assignees: Hitachi, Ltd., Tokyo; Hitachi Maxell, Ltd., Ibaraki, both of Japan

[21] Appl. No.: 76,766

[22] Filed: Jul. 23, 1987

[30] Foreign Application Priority Data

Jul. 30, 1986 [JP] Japan ................. 61-177561

[51] Int. Cl.⁴ ............................................. B29C 45/07
[52] U.S. Cl. ...................... 264/22; 264/1.4; 264/2.2; 264/107; 264/328.7; 264/236; 264/347; 264/284; 264/155; 425/810
[58] Field of Search ............... 264/106, 107, 1.3, 1.4, 264/284, 1.7, 2.2, 154, 328.7, 329.9, 22, 155; 425/810

[56] References Cited

U.S. PATENT DOCUMENTS

| | | | |
|---|---|---|---|
| 3,911,075 | 10/1975 | Boesch | 264/328.9 |
| 4,340,353 | 7/1982 | Mayer | 264/106 |
| 4,354,988 | 10/1982 | Bricot | 264/106 |
| 4,379,686 | 4/1983 | Chambers | 264/107 |
| 4,409,169 | 10/1983 | Bartholdsten | 264/328.7 |
| 4,447,381 | 5/1984 | Matey | 264/107 |
| 4,452,748 | 6/1984 | Lange | 425/810 |
| 4,466,934 | 8/1984 | Cane | 264/155 |
| 4,472,124 | 9/1984 | Kashihara | 264/107 |
| 4,569,806 | 2/1986 | Holster | 264/1.3 |
| 4,707,321 | 11/1987 | Segawa | 264/107 |

FOREIGN PATENT DOCUMENTS 0061438  5/1980  Japan ................. 425/566

Primary Examiner—Jay H. Woo
Assistant Examiner—Jeremiah F. Durkin, II
Attorney, Agent, or Firm—Antonelli, Terry & Wands

[57] ABSTRACT

A method for producing an optical disk base to store, record, and retrieve sounds, images, and information. An improved method for producing an optical disk base includes the steps of injecting a photo-curable resin into a cavity, curing the photo-curable resin by irradiation with light, and demolding, where the photo-curable resin is injected from an injection nozzle having an outside diameter which is substantially equal to the diameter of the center hole of the optical disk base and also having a horn-shaped opening at the forward end. The injection nozzle is arranged at the center of the optical disk base. The forward end of the nozzle is closed after injection and the photo-curable resin is irradiated with light, with the injection nozzle projected into the cavity. A liquid resin is injected in the form of uniform flow without entrapped bubbles, so that the anamolous molecular orientation is avoided and the contamination with insufficiently cured or uncured resin is also avoided.

12 Claims, 5 Drawing Sheets

METHOD FOR PRODUCING OPTICAL DISK BASE

BACKGROUND OF THE INVENTION

The present invention relates to a method and apparatus for producing an optical disk base to store, record, and retrieve sounds, images, and information.

An optical disk base used to make a digital audio disk, video disk, optical disk recording medium, and opto-magnetic disk is a transparent plate, about 1 mm thick, with grooves or pits (information pattern) formed on the surface thereof.

An optical disk base is produced by one of the following known methods. (1) By injecting a polymeric material such as polycarbonate and polymethyl methacrylate into a mold provided therein with a metal stamper having an information pattern in the form of grooves or pits. [See Nikkei Mechanical, p. 34 (1982.2.1) and Nikkei Electronics, p. 133 (1982.6.7).](2) By attaching a photo-curable resin thin film having an information pattern to the surface of a previously prepared transparent base. (See Japanese Patent Laid-open No. 86756/1978 and Japanese Patent Laid-open No. 152028/1980.) (3) By injecting a photo-curable resin into a cavity formed between a stamper having an information pattern and a transparent flat plate, and subsequently curing the photo-curable resin with light energy supplied through the transparent flat plate, and finally removing the stamper and transparent flat plate to give a transparent plate of photo-cured resin having an information pattern.

However, the first method has a disadvantage that the resulting optical disk base tends to be optically anisotropic because it is difficult to completely remove the molecular orientation that takes place while the polymeric material flows and solidifies. Another disadvantage is that the information pattern is not accurately transferred from the stamper to the base, and this leads to an optical disk of poor performance.

The second method also has a disadvantage that transparent bases have to be prepared beforehand, which adds to the number of steps and makes the process complex and costly.

By contrast, the third method has the possibility of eliminating these disadvantages. According to the third method as illustrated in FIGS. 6(a) and 6(b), a photocurable resin is injected from a gate 4 into the mold cavity formed by a transparent plate (such as glass plate) 1 and a stamper 2 having an information pattern, said transparent plate and stamper being placed opposite to each other with a peripheral ring 3 interposed between them. After injection, the resin is cured with light energy supplied from a light source 6.

SUMMARY OF THE INVENTION

Basically, the present invention is based on the above-mentioned third method. Accordingly, it is an object of the present invention to provide a method for producing an optical disk base of high dimensional accuracy. According to the method of the invention, a liquid resin is injected in the form of uniform flow without entrapped bubbles, so that the anomalous molecular orientation is avoided and the contamination with insufficiently cured or uncured resin is also avoided.

This object is achieved by an improved method for producing an optical disk base which includes the steps of injecting a photo-curable resin into a cavity formed between a mold half having an information pattern and another mold half of flat plate which are placed opposite to each other, curing the photo-curable resin by irradiation with light, and demolding, wherein said improvement comprises injecting said photo-curable resin into said cavity through an injection nozzle having an outside diameter which is substantially equal to the diameter of the center hole of the optical disk base and also having a horn-shaped opening at the forward end thereof; closing the forward end of said nozzle after injection; irradiating said photo-curable resin with light, with said injection nozzle projected into said cavity so that said injection nozzle forms an unfilled well having a circular groove therein which facilitates the formation of the center hole.

The photo-curable resin used in the present invention is not specifically limited. It includes acrylate- or methacrylate-type photo-curable resins and polyene- or polythiol-type photo-curable resins which are commonly used for the optical disk base of this kind. The preferred photo-curable resins may have the following compositions.

Composition 1

. Dipentaerythritol hexaacrylate: 30 wt %
. Reaction product of isophorone diisocyanate (1 mol) and 2-hydroxyethyl acrylate (2 mol): 40 wt %
. Isobornyl methacrylate: 29 wt %
. 1-Hydroxycyclohexylphenylketone: 1 wt %

Composition 2

. Dipentaerythritol hexaacrylate: 30 wt %
. Reaction product of 1,1'-methylenebis(4-isocyanatecyclohexane) (1 mol) and 2-hydroxyethyl acrylate (2 mol): 40 wt %
. Bornyl methacrylate: 29 wt %
. 1-Hydroxycyclohexylphenylketone: 1 wt %

The injection of the photo-curable resin may be performed with the injection nozzle projected into the cavity formed between two mold halves. Alternatively, the injection of the photo-curable resin may be performed with the injection nozzle arranged substantially flush with the inside of either mold halves, and, when the injection is substantially completed, the injection nozzle is projected into the cavity and the injected resin is irradiated with light for curing. In the former case, it is not necessary for the nozzle to be movable, which makes operation simple. In the latter case, injection can be performed comparatively easily.

The injection of the photo-curable resin into the cavity should preferably be performed in such a manner that the injected resin overflows the cavity into the run-off receptacle which is formed outside the cavity but communicates with the cavity.

The overflow of the injected resin is necessary because the acrylate-type or methacrylate-type photo-curable resin used for the optical disk base undergoes volume shrinkage when it cures, and volume shrinkage in turn causes sinks and voids in the peripheral part. To address this problem, there was proposed the use of a movable stamper (Japanese Patent Laid-open No. 160388/1980) or a resilient peripheral ring (Japanese Patent Laid-open No. 25921/1982).

These conventional means, however, have some drawbacks. (a) The base formed after curing is not uniform in thickness. (b) The accurate control of inside diameter and outside diameter is difficult. (c) The peripheral ring forms a small gap between itself and the stamper or the transparent plate, and a trace amount of photo-curable resin entering the gap remains uncured or half-cured due to contact with oxygen in air. The uncured resin stains the base and the half-cured resin accumulates to lower the dimensional accuracy of the mold. According to the present invention, the photo-curable resin is injected into the cavity in such a manner that it overflows the cavity into the run-off receptacle. The void resulting from volume shrinkage is filled by the resin from the run-off receptacle. In this way, the occurrence of peripheral sinks and voids is prevented.

To enhance this effect, the run-off receptacle is shielded from light while the injected resin in the cavity is being irradiated for curing. The shielding keeps the resin substantially uncured and hence ensures the smooth replenishment of the resin. After the resin in the cavity has been cured and hence the volume shrinkage has been almost completed, the uncured resin in the run-off receptacle is cut off. Thus it is possible to produce an optical disk base of high dimensional accuracy.

It is another object of the present invention to provide an apparatus for producing an optical disk base. This object is achieved by an improved apparatus for producing an optical disk base which includes a mold half having an information pattern, another mold half of flat plate to be placed opposite to said first mold half, a cavity formed between said mold halves into which a photocurable resin is injected, an injection means with which to inject a photo-curable resin into said cavity, and a light source which supplies light energy through either of said mold halves to cure the photo-curable resin injected into said cavity, characterized in that said injection means is arranged at the center of the optical disk base and it has a cylindrical shape having an outside diameter substantially equal to the diameter of the center hole of the optical disk base and also has an forward opening which outwardly expands and opens in said cavity, said opening being closable by a valve.

The above-mentioned mold halves are placed apart with a space corresponding to the thickness of the desired optical disk base. In other words, this space determines the thickness of the optical disk base.

The mold cavity is formed by a mold-half with an information pattern and another mold-half of flat plate which are placed opposite to each other. At least, one of the moldhalves is made of a material which is transparent to the light to cure the photo-curable resin.

The above-mentioned injection means may be movable in its axial direction so that it projects into the cavity formed by the mold-halves. This structure makes it possible to inject the resin into the cavity from a desired position.

The space formed between the mold-halves may be divided into two parts. One is the cavity which substantially defines the prescribed shape of the optical disk base, and the other is the run-off receptacle surrounding and communicating with the cavity. A proper means may be provided to shield the resin in the run-off receptacle from light. The functions of the run-off receptacle and the light shield are as mentioned above in connection with the method of the invention.

The apparatus of the invention may be provided with a means to cut off the resin in the run-off receptacle which is shielded from light and kept uncured. It may also be provided with a means to remove the cut part of the resin. These means are operated so that the uncured resin stays in the cut-off receptacle while the injected resin is being cured in the cavity and the uncured resin is discharged after the curing of the injected resin is completed. This protects the base and mold from contamination with uncured resin.

In molding operation, the photo-curable resin is injected into the cavity from the horn-shaped opening at the forward end of the injection nozzle. Thus, the photocurable resin in liquid form flows uniformly with no turbulence and bubble entrapment. This prevents anomalous molecular orientation.

The injection nozzle has an outside diameter which is substantially equal to the diameter of the center hole of the optical disk base, and the forward end of the injection nozzle is shaped like a horn which expands outward. While the photo-curable resin is being irradiated with light for curing, the injection nozzle is pushed into the cavity along the center axis of the optical disk base. The nozzle forces aside the resin to form a space which corresponds to the center hole of the optical disk base. At the same time, the forward end of the nozzle makes a groove on the remaining part of the resin above the nozzle. This groove facilitates the punching or cutting of the center hole after curing with the nozzle pushed into the cavity.

Since the injection nozzle is provided with a valve, the photo-curable resin in it does not cure while the photo-curable resin in the cavity is being irradiated.

In addition, the horn-shaped forward end of the injection nozzle properly absorbs the stress which occurs when the resin cures and shrinks, and protects the nozzle from the stress.

DETAILED DESCRIPTION OF THE PREFERRED EMBODIMENTS

The invention is now described in more detail with reference to the following examples.

EXAMPLE 1

Figure 1A:
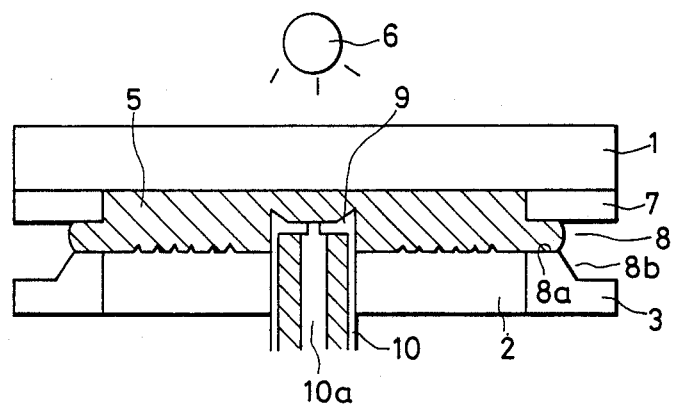
FIGS. 1(a) and 1(b) are schematic representations of the apparatus and steps employed in Example 1 of the present invention.
Figure 1B:
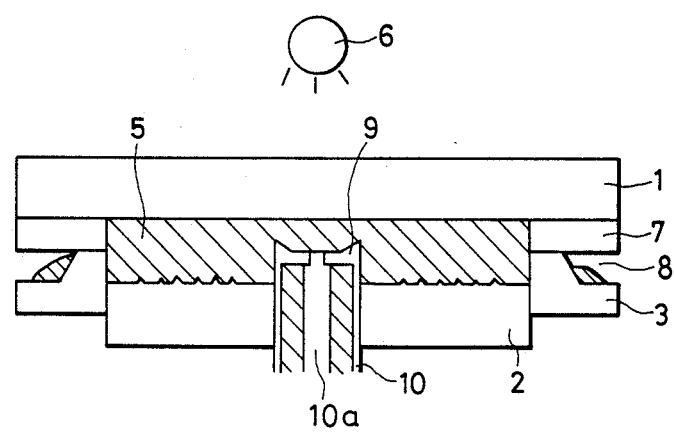

A mold as shown in FIGS. 1(a) and 1(b) was prepared by assembling a quartz plate 1 (10 mm thick and 180 mm in outside diameter), a nickel stamper 2 (130 mm in outside diameter), a black mask 7 (1 mm thick and 130 mm in inside diameter), and a peripheral ring 3 (130 mm in inside diameter). The black mask 7 is attached to the quartz plate 1, and the peripheral ring 3 is slidably fitted onto the periphery of the nickel stamper 2. The quartz plate 1 and the nickel stamper 2 are placed opposite to each other leaving a space of 1.2 mm so that the desired cavity is formed. The peripheral ring 3 forms the run-off receptacle 8b and the escape 8b to receive the uncured resin after cutting.

The injection nozzle 10 has a diameter of 15 mm and is provided at its forward end with a ring 9 (1 mm high) to form the groove. With the injection nozzle projected 1 mm into the cavity, a photo-curable resin 5 of the following composition was injected into the cavity.

Acrylate- and methacrylate-type photo-curable resin:

. Dipentaerythritol hexaacrylate: 30 wt %
. Reaction product of isophorone diisocyanate (1 mol) and 2-hydroxyethyl acrylate (2 mol): 40 wt %
. Isobornyl methacrylate: 29 wt %
. 1-Hydroxycyclohexylphenylketone: 1 wt %

When the injected resin overflowing the cavity occupied about one-third the volume of the cut-off receptacle, the nozzle valve 10a was closed to stop injection.

The injected photo-curable resin 5 was irradiated with light from the light source 6. (Intensity: 20 mW/cm², wavelength: 365 nm). After irradiation for about 20 seconds (which is about one-third the scheduled total irradiation time of 60 seconds), the peripheral ring 3 was raised until it came into close contact with the peripheral black mask, so as to cut and remove the resin which had overflown the cavity. (FIG. 1(a)) After that, the photo-curable resin 5 in the cavity was completely cured.

The cured product was demolded and the center hole was punched out along the groove. Thus there was obtained an optical disk base with an information pattern, having the following accuracy and characteristic properties.

The outside diameter: 130 ±0.1 mm
The diameter of the center hole: 15 ±0.1 mm
The variation of thickness: ±0.05 mm
The optical retardation at 830 nm: less than 5 nm (double pass)

The optical disk base was found to have no voids and sinks resulting from cure shrinkage, and to have high performance for practical use.

EXAMPLE 2

A optical disk base was produced using substantially the same apparatus as in Example 1. The steps employed are illustrated in FIGS. 2(a), 2(b), and 2(c).

An acrylate- and methacrylate-type photo-curable resin of the following composition was used.

. Dipentaerythritol hexaacrylate: 30 wt %
. Reaction product of isophorone diisocyanate (1 mol) and 2-hydroxyethyl acrylate (2 mol): 40 wt %
. Isobornyl methacrylate: 29 wt %
. 1-Hydroxycyclohexylphenylketone: 1 wt %

Figure 2A:
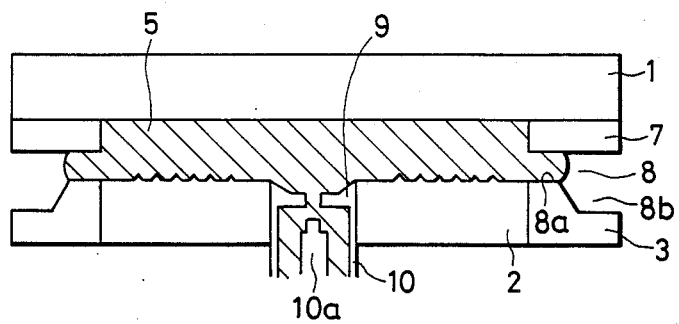
FIGS. 2(a), 2(b), and 2(c) are schematic representations of the apparatus and steps employed in Example 2 of the present invention.
Figure 2B:
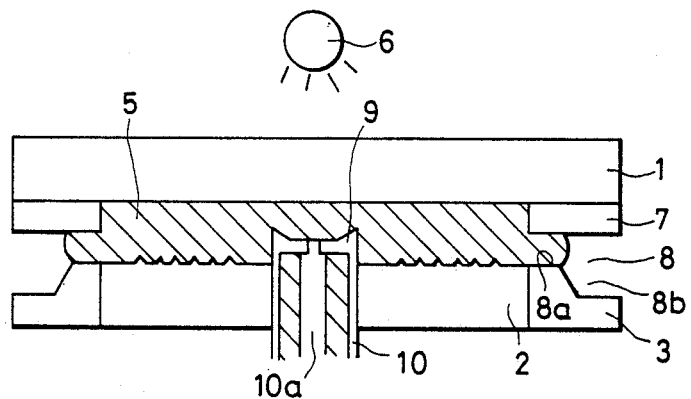
Figure 2C:
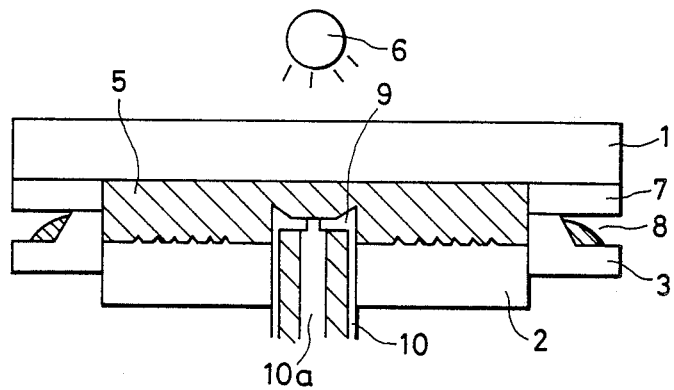

Unlike Example 1, with the injection nozzle 10 positioned such that the forward end thereof is flush with the stamper (as shown in FIG. 2(a)), the photo-curable resin 5 was injected into the cavity. When the injected resin overflowing the cavity occupied about one-third the volume of the cut-off receptacle, the nozzle valve 10a was closed to stop injection. Then the injection nozzle was raised 0.6 mm above the stamper surface (as shown in FIG, 2(b)).

The injected photo-curable resin 5 was irradiated with light from the light source 6. (Intensity: 20 mW/cm², wavelength: 365 nm). After irradiation for about 20 seconds (which is about one-third the scheduled total irradiation time of 60 seconds), the peripheral ring 3 was raised until it came into close contact with the peripheral black mask, so as to cut and remove the resin which had overflown the cavity (as shown in FIG. 2(c)). After that, the photo-curable resin 5 in the cavity was completely cured.

The cured product was demolded and the center hole was punched out along the groove. Thus there was obtained an optical disk base with an information pattern, having the following accuracy and characteristic properties.

The outside diameter: 130 ±0.1 mm
The diameter of the center hole: 15 ±0.1 mm
The variation of thickness: ±0.05 mm
The optical retardation at 830 nm: less than 5 nm (double pass)

The optical disk base was found to have no voids and sinks resulting from cure shrinkage, and to have high performance for practical use.

EXAMPLE 3

A optical disk base was produced using substantially the same apparatus as in Examples 1 and 2. The steps employed are illustrated in FIGS. 3(a), 3(b), and 3(c).

An acrylate- and methacrylate-type photo-curable resin of the following composition was used.

. Dipentaerythritol hexaacrylate: 30 wt %
. Reaction product of isophorone diisocyanate (1 mol) and 2-hydroxyethyl acrylate (2 mol): 40 wt %
. Isobornyl methacrylate: 29 wt %
. 1-Hydroxycyclohexylphenylketone: 1 wt %

Figure 3A:
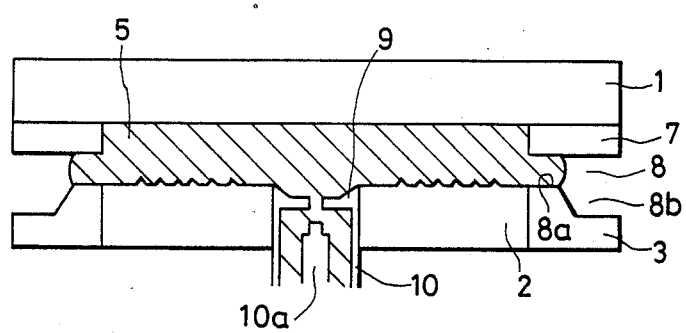
FIGS. 3(a), 3(b), and 3(c) are schematic representations of the apparatus and steps employed in Example 3 of the present invention.
Figure 3B:
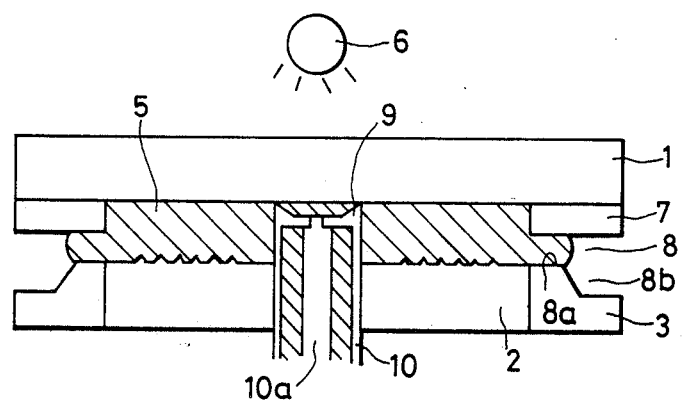
Figure 3C:
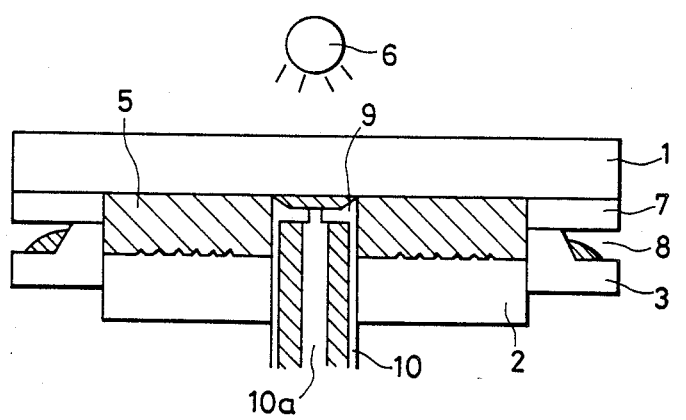

Unlike Examples 1 and 2, with the injection nozzle 10 positioned such that the forward end thereof is flush with the stamper (as shown in FIG. 3(a)), the photo-curable resin 5 was injected into the cavity. When the injected resin overflowing the cavity occupied about one-third the volume of the cut-off receptacle, the nozzle valve 10a was closed to stop injection. Then the injection nozzle was raised 1.2 mm above the stamper surface (as shown in FIG. 3(b)).

The injected photo-curable resin 5 was irradiated with light from the light source 6. (Intensity: 20 mW/cm², wavelength: 365 nm). After irradiation for about 20 seconds (which is about one-third the scheduled total irradiation time of 60 seconds), the peripheral ring 3 was raised until it came into close contact with the peripheral black mask, so as to cut and remove the resin which had overflown the cavity (as shown in FIG. 3(c )). After that, the photo-curable resin 5 in the cavity was completely cured.

The cured product was demolded and the center hole was punched out along the groove. Thus there was obtained an optical disk base with an information pattern, having the following accuracy and characteristic properties.

The outside diameter: 130 ±0.1 mm
The diameter of the center hole: 15 ±0.1 mm
The variation of thickness: ±0.05 mm
The optical retardation at 830 nm: less than 5 nm (double pass)

The optical disk base was found to have no voids and sinks resulting from cure shrinkage, and to have high performance for practical use.

MODIFIED EXAMPLES

In the above-mentioned examples, the injection nozzle 10 has the forward end of such a structure that the periphery extends to form a projecting ring 9 having a cross-section of right-angled triangle. The projecting ring 9 forms a groove which facilitates the punching of the center hole. It is not always necessary that the projecting ring 9 be continuous; but it may be discontinuous so long as it does not disturb the flow of the resin being injected. The discontinuous ring alleviates the stress resulting from cure shrinkage.

In the above-mentioned examples, the cavity is formed by placing apart the transparent flat plate 1 and the stamper 2 opposite to each other, and the run-off receptacle 8 is formed by fitting the peripheral ring onto the periphery of the stamper 2. This structure may be changed as shown in FIGS. 4 and 5.

Figure 4:
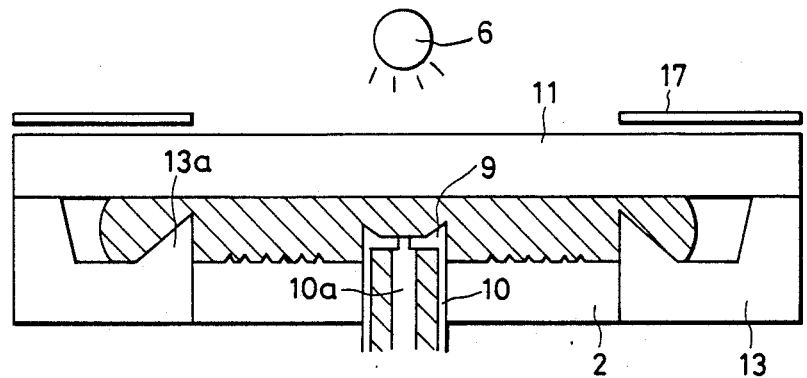
FIGS. 4 and 5 are schematic representations of the modified apparatus used in the invention.

In the case of the structure shown in FIG. 4, the cavity is formed by a flat plate 11 and a nickel stamper 2 which are placed opposite to each other, 1.3 mm apart. The flat plate is made of a material such as tempered glass transparent to light from the light source. It is 200 mm in outside diameter and 1 mm thick. The nickel stamper 2 is 130 mm in outside diameter. The peripheral ring 13 is 130 mm in inside diameter, and it is fixedly fitted to the stamper 2. The top of the peripheral ring 13 is in contact with the bottom of the flat plate 11 so that a space is formed between them. This space communicates with the cavity and receives the resin which has been forced out of the cavity. But this space is mostly separated from the cavity by the groove-forming ring 13a having a cross-section of right-angled triangle. The groove-forming ring 13a projects so as to define the outside diameter of the optical disk base. There is a small gap between the top of the groove-forming ring 13a and the bottom of the flat plate 11.

Figure 5:
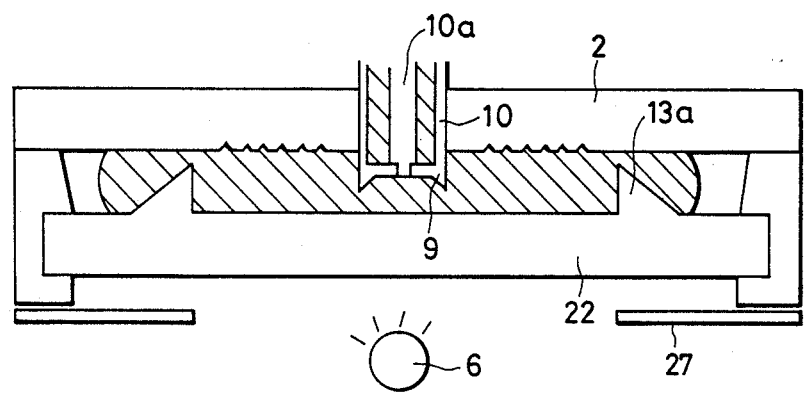
Figure 6A:
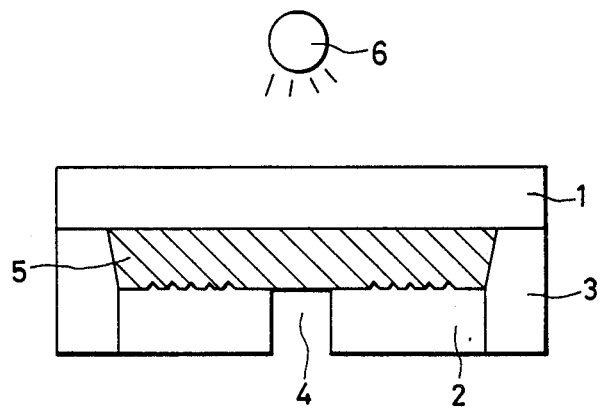
FIGS. 6(a) and 6(b) are schematic representations of the conventional apparatus and steps employed in the production of optical disks.
Figure 6B:
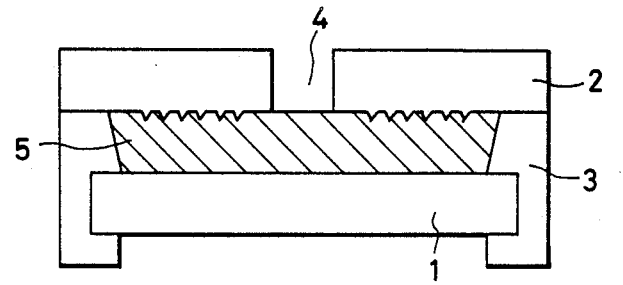
Figure 6B:

In the case of the structure shown in FIG. 5, the groove-forming ring 13i is integrally formed on the transparent flat plact 22. It partly separates the run-off receptacle from the cavity, while permitting them to communicate with each other.

In the examples shown in FIGS. 4 and 5, a light shielding plate 17 or 27 may be attached to prevent the resin in the run-off receptacle from being cured by light.

In the above-mentioned examples, the black mask 7 is attached to the peripheral part of the transparent plate 1 made of quartz for the purpose of light shielding. This black mask 7 may suffice if its inside is black. In addition, it is not always necessary that the black mask 7 be a separate member; but the same effect will be produced simply by blackening the inside of the peripheral part of the transparent plate 1. Alternatively, a masking ring may be attached to the circumference of the transparent plate 1. In this case, the transparent plate 1 has substantially the same diameter as the desired optical disk base and the masking ring has an inside diameter which is equal to the outside diameter of the transparent plate 1.

Moreover, in the above-mentioned examples, the flat plate 1, which is placed opposite to the stamper 2 having an information pattern, is made of a transparent material; but it is also possible that the stamper 2 is made of a transparent material or both members are made of a transparent material.

In addition, in the above-mentioned examples, the peripheral ring 3 is fitted onto the outside of the stamper 2 and the peripheral ring 3 is movable in the axial direction of the apparatus so that the uncured resin is cut off from the cured resin. The same effect will be produced if the masking ring is made movable in the case where the masking ring is fitted onto the circumference of the flat plate. The other cutting means may be used according to the specific structure.

As mentioned above, the present invention permits the high-speed and economical production of optical disk bases having a high dimensional accuracy and a minimum of optical strain without the need of complex apparatus and steps.

What is claimed is:

1. A method for producing an optical disk base having a center hole, which includes the steps of injecting a photo-curable resin into a cavity formed between a mold half having an information pattern and another mold half of flat plate which are placed opposite to each other, curing the photo-curable resin by irradiation with light, and demolding, wherein said photo-curable resin is injected into said cavity through an injection nozzle having an outside diameter which is substantially equal to the diameter of the center hole of the optical disk base, said injection nozzle having a forward end where the photo-curable resin exits the nozzle and having a horn-shaped opening at the forward end thereof; wherein the forward end of said nozzle is closed after injection; wherein said photo-curable resin is irradiated with light with said injection nozzle projected into said cavity so that said injection nozzle forms an unfilled well having a circular groove therein which facilitates the formation of the center hole; and wherein said center hole is punched out along said circular groove after said demolding.

2. A method for producing an optical disk base set forth in claim 1, wherein the injection of said photo-curable resin is performed with said injection nozzle projected into said cavity.

3. A method for producing an optical disk base set forth in claim 1, wherein the injection of said photo-curable resin is performed with said injection nozzle arranged substantially flush with the inside of either said mold halves, and when the injection of the resin is substantially complete, the resin is irradiated with light for curing, with said injection nozzle projected into said cavity.

4. A method for producing an optical disk base set forth in claim 1, wherein said photo-curable resin is injected until it overflows the cavity into a run-off receptacle which is formed outside the cavity and communicates with the cavity.

5. A method for producing an optical disk base set forth in claim 4, wherein said photo-curable resin is irradiated with light for curing, with the resin in said run-off receptacle shielded from light, so that the resin in said cavity is selectively cured while the resin in said run-off receptacle is kept uncured.

6. A method for producing an optical disk base set forth in claim 5, wherein the uncured resin in said run-off receptacle is cut off and removed when the volume shrinkage of said resin by curing substantially stops in the curing reaction in said cavity.

7. A method for producing an optical disk base set forth in claim 4, wherein, during the curing, the resin shrinks, with resin in said run-off receptacle transferring into said cavity so as to avoid voids in the optical disk base caused by the shrinking.

8. A method for producing an optical disk base set forth in claim 5, wherein the curing of the photo-curable resin is performed for a first time period, then the uncured resin in said run-off receptacle is cut off and removed, and then curing is continued, for a second time period.

9. A method for producing an optical disk base set forth in claim 8, wherein said first time period is a period of time such that substantially all shrinking of the resin during the curing is completed.

10. A method for producing an optical disk base set forth in claim 1, wherein the forward end of the injection nozzle forms a projecting ring having a cross-section of a right triangle.

11. A method for producing an optical disk base set forth in claim 1, wherein the forward end of the injection nozzle forms a projecting ring that is discontinuous.

12. A method for producing an optical disk base set forth in claim 1, wherein the photo-curable resin is selected from the group consisting of acrylate, methacrylate, polyene and polythiol photo-curable resins.

* * * * *